United States Patent
Hayashi (10) Patent No.: US 9,148,641 B2
(45) Date of Patent: Sep. 29, 2015

(54) IMAGING APPARATUS FOR ACQUIRING POSITION INFORMATION OF IMAGING APPARATUS DURING IMAGING AND PROGRAM THEREOF

(75) Inventor: Hiroyuki Hayashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 204 days.

(21) Appl. No.: 13/125,511

(22) PCT Filed: Oct. 20, 2009

(86) PCT No.: PCT/JP2009/068070
§ 371 (c)(1),
(2), (4) Date: Apr. 21, 2011

(87) PCT Pub. No.: WO2010/047332
PCT Pub. Date: Apr. 29, 2010

(65) Prior Publication Data
US 2011/0199509 A1    Aug. 18, 2011

(30) Foreign Application Priority Data
Oct. 22, 2008  (JP) ................. 2008-271868

(51) Int. Cl.
*H04N 9/82* (2006.01)
*H04N 5/77* (2006.01)
*H04N 9/804* (2006.01)

(52) U.S. Cl.
CPC ............. *H04N 9/8205* (2013.01); *H04N 5/772* (2013.01); *H04N 9/8042* (2013.01)

(58) Field of Classification Search
None
See application file for complete search history.

(56) References Cited

U.S. PATENT DOCUMENTS 6,571,052 B1    5/2003  Wakimoto et al.
6,625,383 B1    9/2003  Wakimoto et al.
(Continued)

FOREIGN PATENT DOCUMENTS

CN    101246014 A    8/2008
JP    9-322109 A    12/1997
(Continued)

OTHER PUBLICATIONS

European Search Report mailed Feb. 24, 2012.

Primary Examiner — Twyler Haskins
Assistant Examiner — Angel L Garces-Rivera
(74) Attorney, Agent, or Firm — Birch, Stewart, Kolasch & Birch, LLP (57) ABSTRACT

Information concerning an imaging place is acquired from a map information acquisition portion, and the acquired information related to the position is multiplexed with video image information to be recorded in a recording medium. The information related to positions separated at the time of reproducing is displayed by being superimposed onto a video image so that it is possible to switch from/to display/non-display. Further, the information related to a position is input by an operation portion, and the time corresponding thereto is taken from the multiplexed file, thereby making it possible to start reproduction from a part in which a specified position is imaged. It is therefore an object of the present invention to record the information related to the imaged place together with a video image, and to be able to switch from/to display/non-display of the information related to the place. Additionally, it is an object to perform control of reproduction based on the information related to a place.

22 Claims, 7 Drawing Sheets

(56) References Cited

U.S. PATENT DOCUMENTS

| | | |
|---|---|---|
| 2003/0095789 A1 | 5/2003 | Wakimoto et al. |
| 2003/0235399 A1 | 12/2003 | Kawahara |
| 2004/0239688 A1* | 12/2004 | Krajec .......................... 345/629 |
| 2008/0022203 A1* | 1/2008 | Fernandez .................... 715/716 |

FOREIGN PATENT DOCUMENTS

| | | | | |
|---|---|---|---|---|
| JP | 09322109 A | * | 12/1997 | ............ H04N 5/907 |
| JP | 2000-165809 A | | 6/2000 | |
| JP | 3109130 B2 | | 9/2000 | |
| JP | 2001-169164 A | | 6/2001 | |
| JP | 2001169164 A | * | 6/2001 | ............ H04N 5/225 |
| JP | 2003-219403 A | | 7/2003 | |
| JP | 2005-39702 A | | 2/2005 | |
| JP | 2005039702 A | * | 2/2005 | ............... H04B 7/26 |
| JP | 2005-086265 A | | 3/2005 | |
| JP | 2006-148514 A | | 6/2006 | |
| JP | 2007-164534 A | | 6/2007 | |
| JP | 2007164534 A | * | 6/2007 | |
| JP | 2008-277959 A | | 11/2008 | |

* cited by examiner

| LATITUDE/LONGITUDE | DIRECTION | DISTANCE | MAP INFORMATION |
|---|---|---|---|
| LATITUDE X NORTH AND LONGITUDE Y EAST | — | — | ABC TOWN |
| LATITUDE X NORTH AND LONGITUDE Y EAST | NORTH | — | A BUILDING |
| LATITUDE X NORTH AND LONGITUDE Y EAST | NORTHEAST | — | B BUILDING |
| LATITUDE X NORTH AND LONGITUDE Y EAST | SOUTH | — | D BUILDING |
| LATITUDE X NORTH AND LONGITUDE Y EAST | SOUTH | 1m ~ 15m | C BUILDING |
| LATITUDE X NORTH AND LONGITUDE Y EAST | SOUTH | 15m ~ 30m | D BUILDING |
| ... | ... | ... | ... |

IMAGING APPARATUS FOR ACQUIRING POSITION INFORMATION OF IMAGING APPARATUS DURING IMAGING AND PROGRAM THEREOF

FIELD OF THE INVENTION

The present invention relates to an imaging apparatus and a program.

BACKGROUND ART

Conventionally, technique to record information related to an imaging place together with a video image at the time of imaging is described in Patent Literature 1, for example. The literature describes an apparatus including a GPS receiving apparatus that acquires a self position and acquiring a place name corresponding to the self position from map information database inside the apparatus so that character information is superimposed onto a video image to be recorded.

KNOWN ART LITERATURES

Patent Literature

Patent Literature 1: Japanese Patent Publication No. 3109130

SUMMARY OF THE INVENTION

Problems to be Solved by the Invention

However, in the technique of Patent Literature 1, information concerning a self position is recorded as video image information, thus the imaged object has become invisible because of the superimposed character information.

Additionally, in the technique of Patent Literature 1, it is possible to ordinarily reproduce the imaged content to recognize a place name currently being reproduced, however, it has been difficult to select from a plurality of contents a content in which a specific place name is recorded, and search a specific place name in contents and reproduce the place from a recorded part thereof.

In view of the problems described above, it is an object of the present invention to provide an imaging apparatus, etc. in which a user is able to switch display/non-display of position information as needed, and the position information enables reproduction of a specific scene.

Means to Solve the Problems

In order to solve the problems described above, it is characterized in that an imaging apparatus of the present invention is provided with a video imaging portion that takes a video image, a position information acquisition portion that acquires position information including a position of a self terminal, a map information acquisition portion that acquires map information corresponding to the position information acquired by the position information acquisition portion, a multiplex portion that multiplexes a video image taken by the video imaging portion and map information acquired by the map information acquisition portion that are related to each other to serve as contents data and associated with the time in which the video image is taken or the time in which the map information is acquired, and a recording portion that records the contents data multiplexed by the multiplex portion.

Furthermore, the imaging apparatus of the present invention is characterized in that the position information acquisition portion acquires the direction of the self terminal as position information together with the position of the self terminal, and the map information acquisition portion acquires the map information based on the position of the self terminal and the direction of the self terminal included in the position information.

Furthermore, the imaging apparatus of the present invention is characterized in that the map information acquisition portion acquires the map information based on imaging conditions of the video image taken by the video imaging portion together with the position information.

Furthermore, it is characterized in that the imaging apparatus of the present invention is further provided with a map information database portion that stores the position information and the map information correspondingly, and the map information acquisition portion reads out and acquires from the map information database the map information corresponding to the position information acquired by the position information acquisition portion.

Furthermore, it is characterized in that the imaging apparatus of the present invention is further provided with a communication portion that communicates with a map information provision apparatus for providing the map information, and the map information acquisition portion acquires the map information corresponding to the position information acquired by the position information acquisition portion from the map information provision apparatus via the communication portion.

Furthermore, it is characterized in that the imaging apparatus of the present invention is further provided with a voice input portion for inputting a voice, and the multiplex portion multiplexes the video image taken by the video imaging portion, the map information acquired by the map information acquisition portion and the voice input by the voice input portion as contents data.

Furthermore, it is characterized in that the imaging apparatus of the present invention further includes an input portion for inputting a search word, and is further provided with a search control portion that controls over searching the map information that coincides with the search word input by the input portion from the map information included in the contents data multiplexed by the multiplex portion and a video image output portion that outputs a video image corresponding to the map information searched by the search control portion.

A program of the present invention is characterized by realizing in a computer provided with a video imaging apparatus for taking a video image a position information acquisition function for acquiring position information including a position of a self terminal, a map information acquisition function for acquiring map information corresponding to the position information acquired with the position information acquisition function, a multiplex function for multiplexing the video image taken by the video imaging apparatus and the map information acquired with the map information acquisition function that serve as contents data to be associated with the time in which the video image is taken or the time in which the map information is acquired and a recording function for recording the contents data multiplexed with the multiplex function.

Effect of the Invention

According to the present invention, map information acquired based on position information including a position of a self terminal and a taken video image serve as contents data and are associated with the time in which the video image is taken or the time in which the map information is acquired to be multiplexed and recorded. Therefore, it becomes possible to acquire the video image of the contents data together with map information to be displayed by being superimposed at any positions of the video images in the case of reproducing the images of the contents data.

Further, according to the present invention, a direction of a self terminal is acquired as position information together with a position of the self terminal, and map information is acquired based on the position and the direction of the self terminal. Therefore, it becomes possible to acquire the map information in the direction that is recorded as a video image.

Further, according to the present invention, it is possible to acquire map information based on imaging conditions together with the position information. Therefore, even when there are a plurality of what are appeared as video images from among directions of a self terminal, it becomes possible to acquire more appropriate map information.

Further, according to the present invention, it becomes possible to acquire position information by reading out from the map information database portion in the case of acquiring.

Further, according to the present invention, it becomes possible to acquire map information from the map information provision apparatus. In this case, there is no need for recording the map information in the imaging apparatus.

Further, according to the present invention, it becomes possible to specify contents related to the map information by extracting contents including a search word from a plurality of contents and output a video image related to the map information by determining a reproduction position according to an imaging time in which the search word is recorded in the contents. Therefore, it becomes possible to select the desired contents from a plurality of contents and determine the desired reproduction position more appropriately among the contents.

MODE FOR CARRYING OUT THE INVENTION

Hereinafter, description will be given for an embodiment of the present invention with reference to accompanying diagrams for understanding of the present invention. Note that, the following embodiment is an example that embodies the present invention and does not restrict the technical scope of the present invention.

Embodiment

[1. Configuration of Functions]

Figure 1:
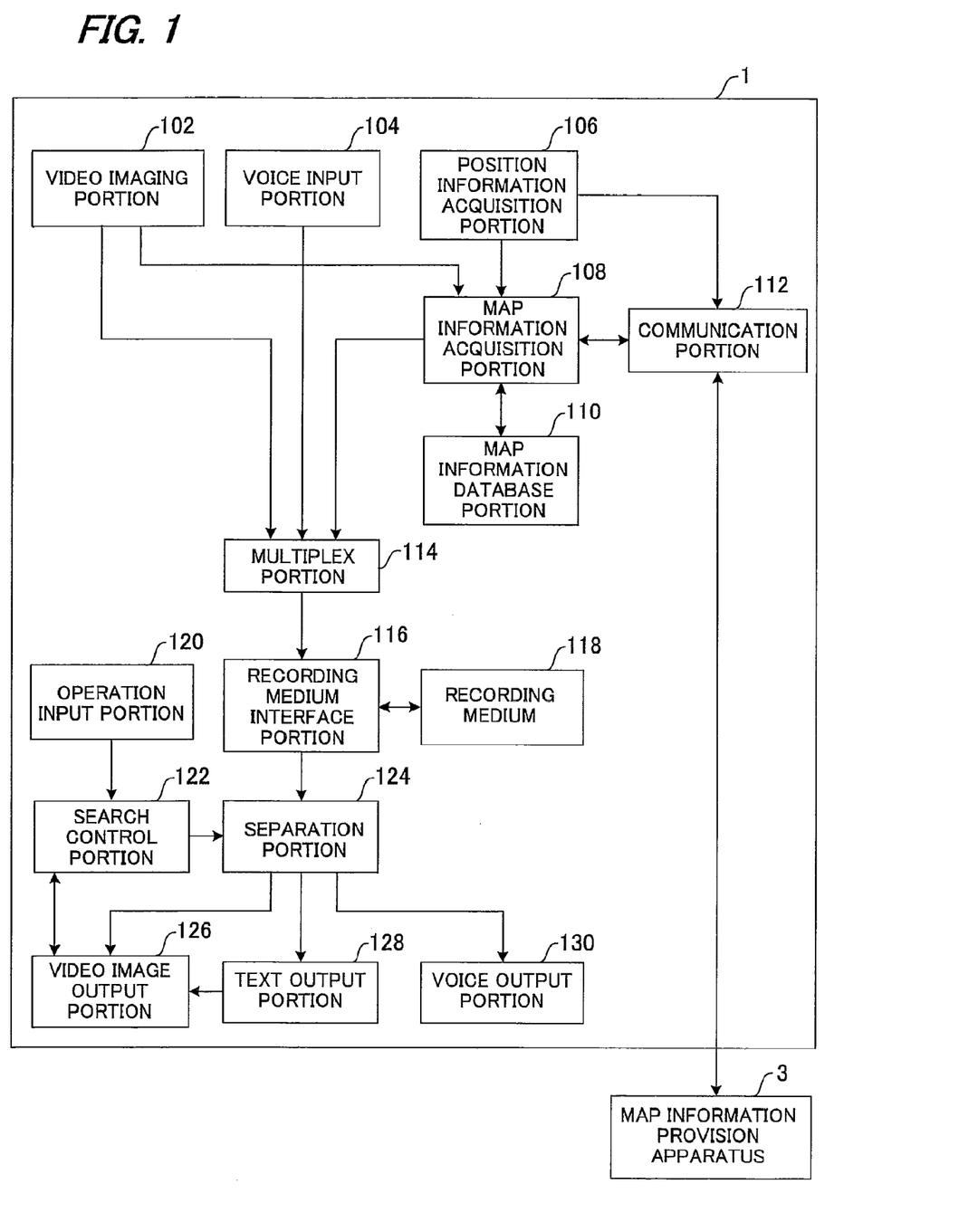
FIG. 1 is a diagram for describing a configuration of functions of an imaging apparatus in the present embodiment.

FIG. 1 is a diagram for describing a configuration of functions of an imaging apparatus 1 applying the present invention. As described in FIG. 1, the imaging apparatus 1 is configured by including a video imaging portion 102, a voice input portion 104, a position information acquisition portion 106, a map information acquisition portion 108, a map information database portion 110, a communication portion 112, a multiplex portion 114, a recording medium interface portion 116, a recording medium 118, an operation input portion 120, a search control portion 122, a separation portion 124, a video image output portion 126, a text output portion 128 and a voice output portion 130. Additionally, the imaging apparatus 1 is connected to the map information provision apparatus 3 via the communication portion 112.

The video imaging portion 102 is a function portion for outputting a video image input from an imaging device (for example, CCD camera) as video image data. The video image data output by the video imaging portion 102, in order to perform compression of the amount of information, is generally information that is encoded by a moving image encoder such as MPEG-4 and H. 264.

Moreover, imaging conditions (angle of view, focal length, depth of field, etc.) in which imaging is performed by the video imaging portion 102 is additionally output. The map information acquisition portion is able to calculate the distance to an object based on the imaging conditions. Note that, in the present embodiment, the imaging conditions are output as a part of video image data (for example, imaging conditions data is stored in a part of user data of the encoded video image bit stream), but may be output as imaging data separate from the video image data, for example.

Furthermore, the voice input portion 104 is a function portion for outputting a voice input from a voice input device (for example, microphone) as voice data. Note that, the voice data output by the voice input portion 104, in order to perform compression of the amount of information, is generally information encoded by a voice encoder such as MP3 (MPEG Audio Layer-3) and AAC (Advanced Audio Coding).

The position information acquisition portion 106 is a function portion for acquiring with use of a position measuring instrument a position of the imaging apparatus 1 (position of a self terminal) which is output as position information. For example, a GPS receiving apparatus is used to acquire latitude/longitude. Such latitude/longitude is output to the map information acquisition portion 108 and the communication portion 112 as the position information. Further, the position information acquisition portion 106 is able to detect and output a direction (way) that is taken by the imaging apparatus 1. Accordingly, the position information such as "latitude A north and longitude B east, imaging direction: northward" is output, for example.

The map information acquisition portion 108 is a function portion for acquiring map information based on the position information and the imaging conditions acquired by the position information acquisition portion 106. Specifically, the map information corresponding to the position information and the imaging conditions is acquired from map data that has been stored in the map information database portion 110. Here, the map information database portion 110 is stored in a storage apparatus and a storage medium such as an HDD (Hard Disk Drive) and a DVD-ROM.

Figure 2:
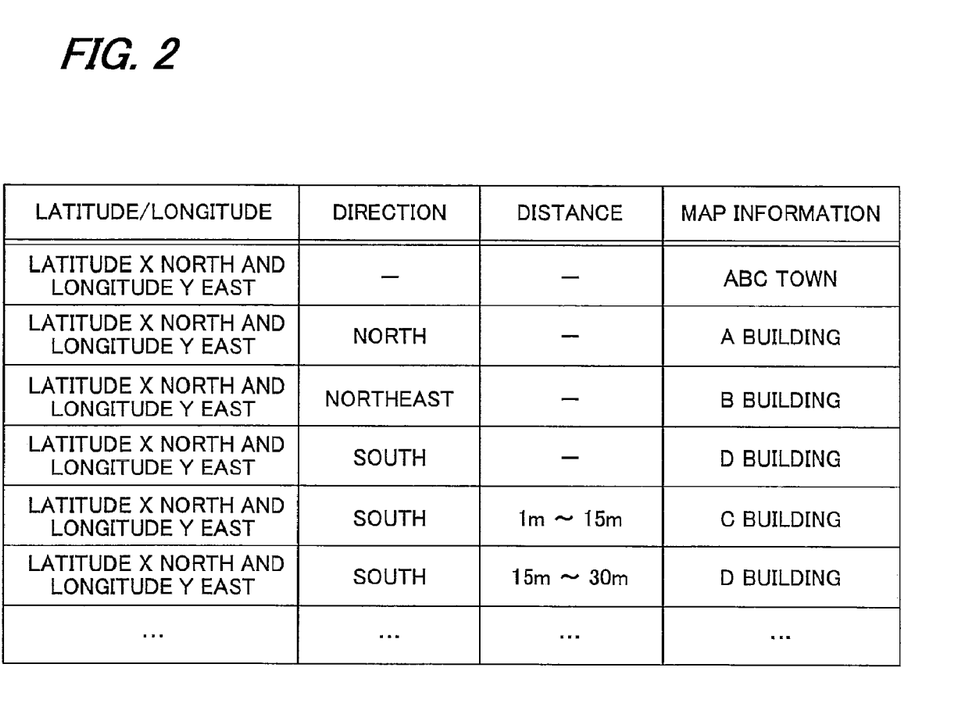
FIG. 2 is a diagram showing an example of a data configuration of map data in the present embodiment.

Here, an example of a configuration of the map data that is stored in the map information database portion 110 is shown in FIG. 2. In the map information database portion 110, "latitude/longitude", "direction", "distance" to an object and "map information" are associated with each other and stored. Additionally, the information in the case of acquiring none of "direction" and "distance" is stored.

As describing FIG. 2 as an example, in the case where only "latitude X north and longitude Y east" is able to be acquired as latitude/longitude, the map information becomes "ABC town". Additionally, in the case where a direction "south" is further able to be acquired, the map information becomes "D building". Moreover, in the case where distance "10 m" to an object is further able to be calculated from the imaging conditions, the map information becomes "C building". Note that, a method of calculating the distance to the object from various imaging conditions (angle of view, focal length and depth of field) uses any known methods and the detailed description is omitted.

Here, the map data corresponding to the position information, in the case of not being recorded in the map information database portion 110, is acquired from the map information provision apparatus 3 via the communication portion 112. Specifically, the map data corresponding to the position information acquired from the position information acquisition portion 106 is inquired to the map information provision apparatus 3. The corresponded map data, in the case of being present, is transmitted from the map information provision apparatus 3 to the communication portion 112. The map data is then recorded by being added and updated to the map information database portion 110. The map information acquisition portion 108 acquires the corresponding map information from the recorded map data by being added and updated.

The communication portion 112 is a function portion for receiving the map information (map data) from the map information provision apparatus 3. When the position information is input from the position information acquisition portion 106 and control over acquiring from the map information provision apparatus 3 is performed by the map information acquisition portion 108, the map data is received via the communication portion 112.

The multiplex portion 114 is a function portion for multiplexing video image data output from the video imaging portion 102, voice data output from the voice input portion 104 and map information output from the map information acquisition portion 108 to output as contents data. The contents data is output to the recording medium interface portion 116.

Figure 3:
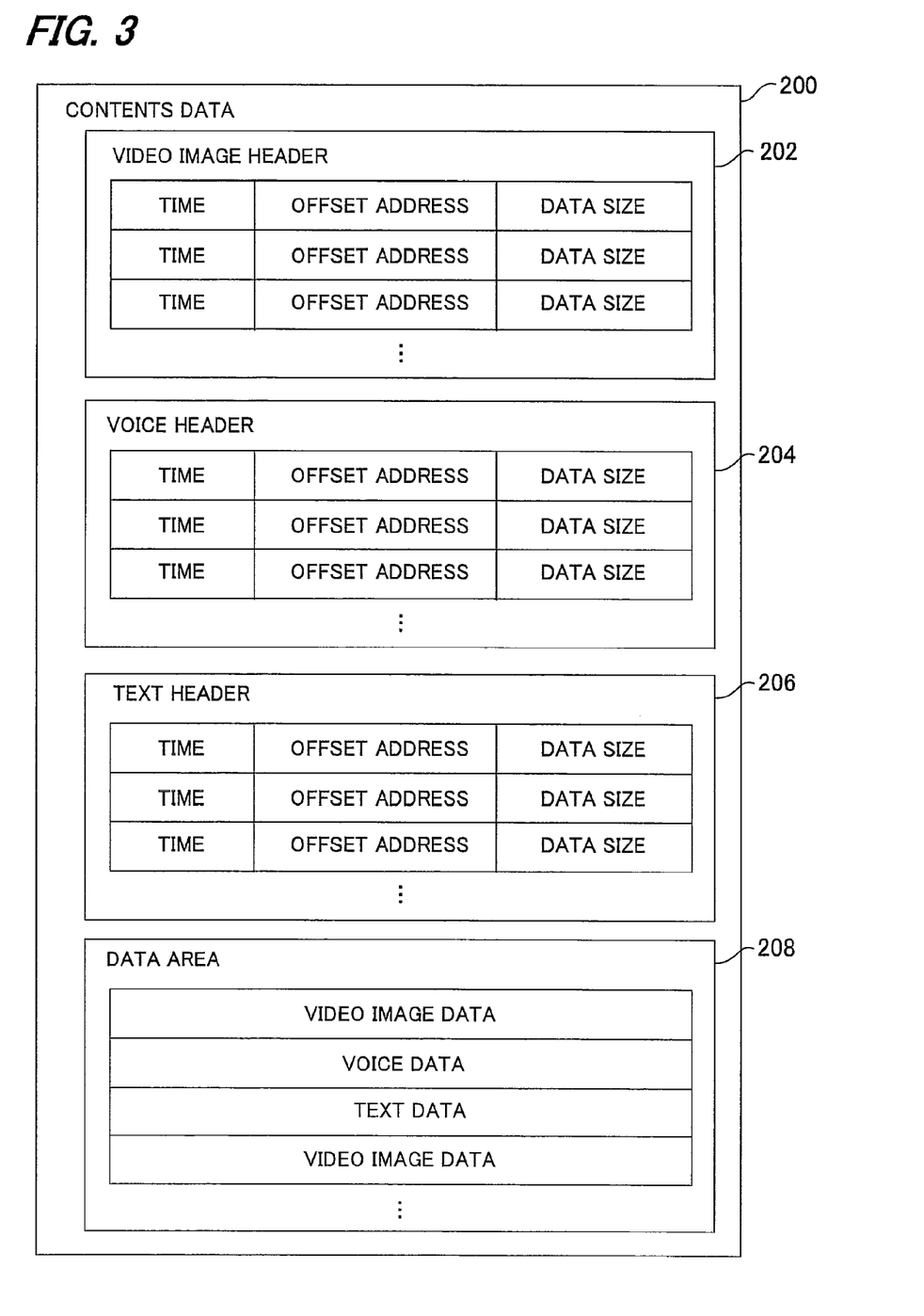
FIG. 3 is a diagram showing an example of a data configuration of contents data in the present embodiment.

Here, description will be given for contents data with use of FIG. 3. FIG. 3 is a diagram for describing a configuration of contents data 200. The contents data 200 is composed of a video image header 202 that stores information related to the multiplexed video image data, a voice header 204 that stores information related to voice data, a text header 206 that stores information related to text data and a data area 208 that stores the video image data, the voice data and the text data along with the passage of time.

Each header includes the time in which the corresponding data is taken (imaging time), an offset address that indicates at which position of the data area 208 each data is stored, and storage capacity (size) of the data. This makes it possible to specify a position (imaging time) of contents data corresponding to text data by which the text data is designated, for example. Then, the contents data is reproduced from the position (imaging time) of the contents data, thereby being reproduced from the time that is corresponded to the text data.

Note that, the imaging time described above also includes the time in which the map information is acquired other than the time in which the data is taken. That is, the time in which the map information is acquired is judged as the time in which the imaging is performed, and recording is performed.

The recording medium 118 records the contents data multiplexed by the multiplex portion 114. The contents data multiplexed by the multiplex portion 114 is recorded in the recording medium 118 via the recording medium interface portion 116. The recording medium 118 is composed of a recording medium including a magnetic disk such as an HDD (Hard Disk Drive) and a flash memory such as an SD card.

The operation input portion 120 is a function portion for which a user inputs the operation. The function portion, for example, is such that an operation instruction related to record and reproduction is performed, and a search word is selected as described below. An example is given for a configuration provided with an operational button, a touch panel and the like.

The search control portion 122 is a function portion for controlling over searching whether or not the search word selected by the operation input portion 120 is included in the text data of the contents data. Here, selecting search words is that a user inputs any search words and selects one or a plurality of search words from among a plurality of candidates for search words. For example, a plurality of candidates for search words are output to the video image output portion 126. The user then operates the operation input portion 120 to select one or a plurality of search words from among the output search words.

The separation portion 124 is a function portion for separating the contents data recorded in the recording medium 118 into video image data, voice data and text data. After each data is separated, the video image data is output by the video image output portion 126, the voice data is output by the voice output portion 130 and the text data is output by the text output portion 128, respectively.

The video image output portion 126 is a function portion for outputting the video image data input from the separation portion 124 to a video image display apparatus (for example, liquid crystal display). Additionally, the voice output portion 130 is a function portion for outputting the voice data input from the separation portion 124 to a voice output apparatus (for example, speaker).

The text output portion 128 is a function portion for outputting the text data input from the separation portion 124 to a video image display apparatus. The text data in the present embodiment mainly refers to map information. Here, the text data, in the case of being output, in the video image output portion 126, is synthesized with the video image data to be output in a state where the video image and the text are superimposed.

[2. Flows of Processing]

Subsequently, description will be given for flows of processing of the imaging apparatus 1 with use of diagrams.

[2.1 Contents Data Recording Processing]

Figure 4:
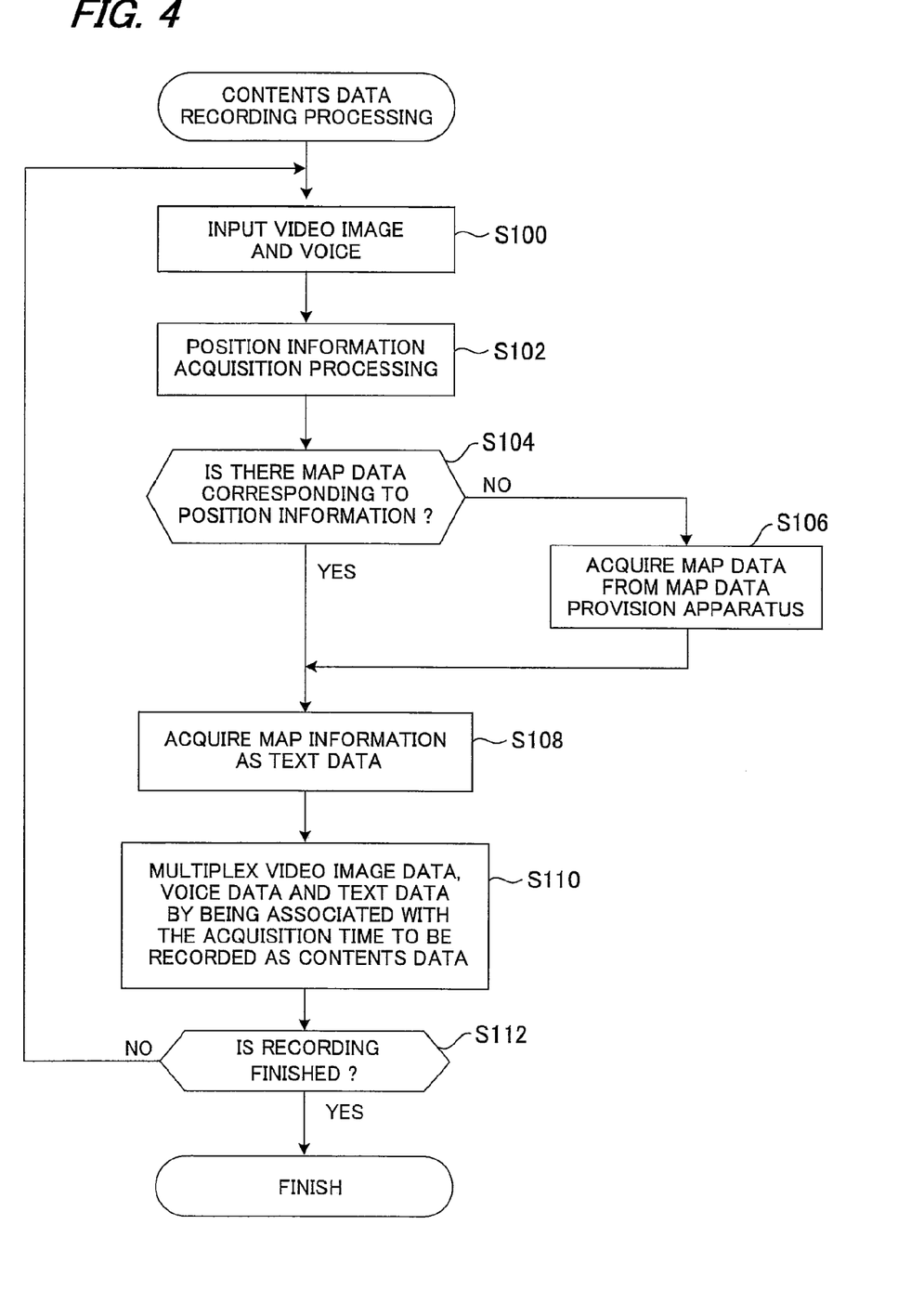
FIG. 4 is a diagram for describing contents data recording processing in the present embodiment.

First, description will be given for processing for recording contents data with use of FIG. 4. A video image and a voice are, in the case of being input from the video imaging portion 102 and the voice input portion 104 (step S100), output to the multiplex portion 114 as video image data and voice data.

Subsequently, position information acquisition processing is executed for acquiring position information of the imaging apparatus 1 (self terminal) from the position information acquisition portion 106 (step S102). Here, in the present embodiment, a position (latitude/longitude) of a self terminal is acquired with a GPS receiving apparatus connected to a video imaging apparatus.

Subsequently, it is judged whether or not map data corresponding to position information is stored in the map information database portion 110 (step S104). Here, when there is no map data corresponding to the position information, the map data corresponding to the position information is acquired from the map information provision apparatus 3 via the communication portion 112 (step S104; No→step S106). Further, when the imaging conditions are able to be acquired here, the map information is acquired based on the position information and the imaging conditions.

Subsequently, the map information is acquired from the above-described map data as text data (step S108). Then, the multiplex portion 114 multiplexes the video image data and the voice data output at the step S100, and the text data including the map information output at the step S108 associated with the time in which the video image data is taken (or the time in which the map information is acquired), which is recorded in the recording medium 118 as contents data via the recording medium interface portion 116 (step S110).

Then, in the case of finishing recording, the contents data recording processing is finished (step S112; Yes), and in the case of still continuing to record, the processing is repeatedly executed from the step S100 (step S112; No→step S100).

[2.2 Contents Data Reproduction Processing]

Figure 5:
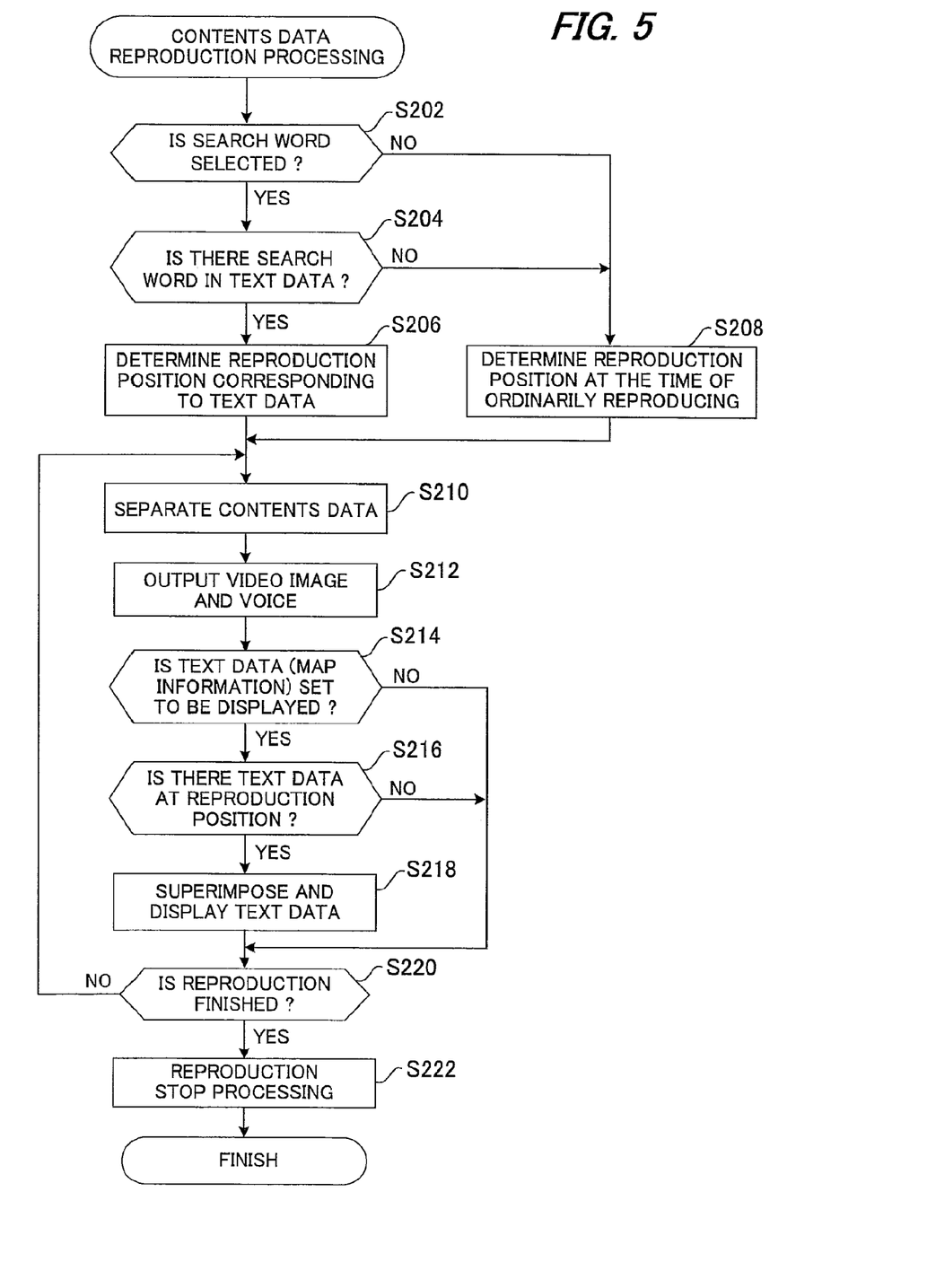
FIG. 5 is a diagram for describing contents data reproduction processing in the present embodiment.

Subsequently, description will be given for processing for reproducing contents data that is recorded in the recording medium 118 with use of FIG. 5. Contents data reproduction processing is processing to be executed when contents data desired to be reproduced is selected from the contents data that is recorded in the recording medium 118.

First, it is judged whether a search word is selected from the operation input portion 120 (step S202). Here, as a method of selecting a search word, a user may input any words with the operation input portion 120 or may select a search word from among candidates for search words.

When a search word is selected (step S202; Yes), it is judged whether or not the search word is included in the text data included in the contents data (step S204). Specifically, the multiplexed data is separated and the text data is extracted. Then, the search word is searched whether or not to be included in the extracted text data. Here, when the text data is included in the search word (step S204; Yes), a reproduction position (time) is determined corresponding to the text data (step S206).

The contents data is then separated into video image data, voice data and text data by the separation portion 124 (step S210), and based on the reproduction position determined at the step S206, the video image data is output to the video image output portion 126 and the voice data is output to the voice output portion 130, respectively (step S212). That is, the reproduction position is determined based on the reproduction time associated with the above-described contents data, in reference to the contents data 200.

Note that, at the step S202, in the case where the search word is not selected (step S202; No), or in the case where the search word is not included in the text data although the search word is selected (step S204; No), a reproduction position of a predetermined position (such as the first position and an interrupted position of the contents data, for example) is determined as the reproduction position (step S208).

Here, when displaying the text data (map information) is set (step S214; Yes), it is judged whether or not the text data is recorded at the imaging time corresponding to a current reproduction position (time) (step S216). Here, when the text data is recorded (step S216; Yes), the text data is output to the text output portion 128. The text output portion 128 executes processing for displaying the text data by being superimposed onto the video image being output from the video image output portion 126 (step S218).

Then, when reproduction of the contents data is finished (step S220; Yes), reproduction stop processing is performed and the processing is finished (step S222). On the other hand, when the reproduction of the contents data is not finished (steps S220; No), the processing is repeatedly executed from the step S210.

[3. Operational Example]

Figure 6:
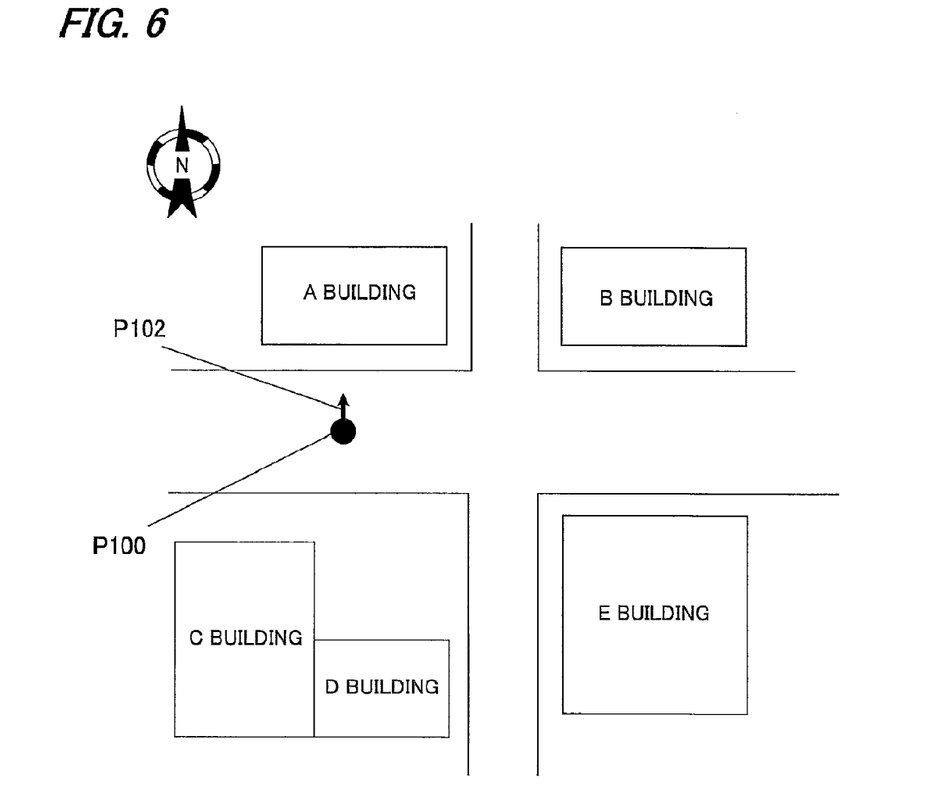
FIG. 6 is a diagram for describing an operational example in the present embodiment.

Subsequently, description will be given for an operational example in the present embodiment. FIG. 6 shows a photographer P100 holding the imaging apparatus 1 and a direction P102 in which the photographer is facing (the imaging apparatus 1 is performing imaging). FIG. 6 shows that an upper side of the sheet indicates north.

Here, there exists an A building in a northern direction, a B building in a northeastern direction, a C building and a D building in a southern direction and an E building in a southeastern direction, of the photographer P100.

At the time, position information of the photographer P100 is (latitude X north and longitude Y east), and the direction P102 is "north". Here, when map information corresponding to the position is read out from the map information database portion 110 shown in FIG. 2, the "A building" is indicated. Accordingly, the map information "A building" is associated with a video image of the A building by the imaging apparatus 1 and recorded as text data.

Figure 7:
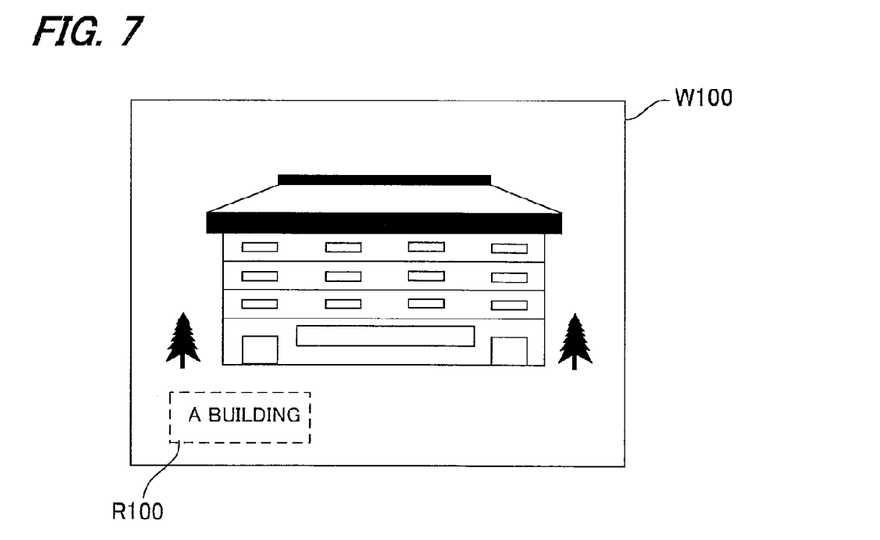
FIG. 7 is a diagram for describing an operational example in the present embodiment.

FIG. 7 is a diagram showing an example of a display screen W100 in the case of reproducing the imaged A building. On the display screen W100, "A building" is displayed in an area R100 as text data (map information) together with the video image of the A building. Here, the map information is switchable from/to display and non-display by a user.

Figure 8:
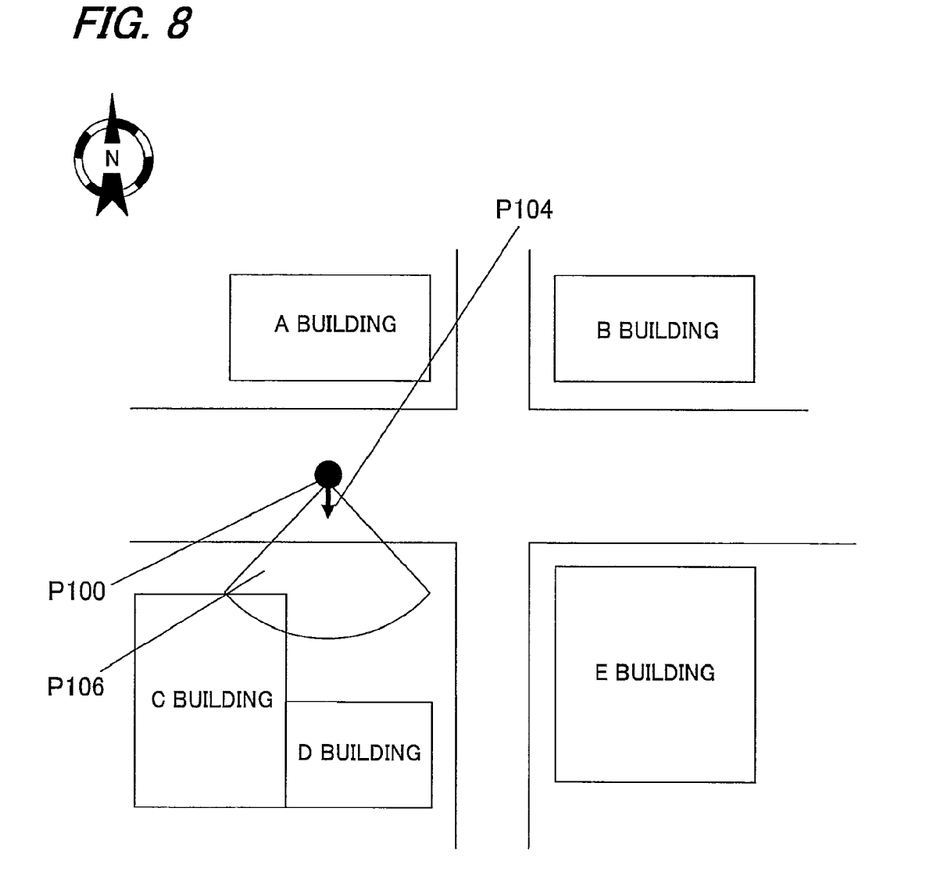
FIG. 8 is a diagram for describing an operational example in the present embodiment.

Further, FIG. 8 is a diagram for describing the case where the photographer is facing to a direction P104 (south) in FIG. 6. At the time, a range in which the video imaging portion 102 is imaging is P106. From the imaging conditions (angle of view, focal length and depth of field) at the time, the distance to an object that is currently imaged is able to be calculated. For example, in the case where the distance to the object at the time is calculated as approximately "10 m", "C building" is acquired as the map information (refer to FIG. 2).

[4. Modification Example]

The imaging apparatus in which the present invention is applied is described in the above-described embodiment, and what is applicable as the imaging apparatus is applicable for a variety of apparatuses. That is, it is of course applicable for various electronic devices such as mobile phones and PDAs with cameras, and computers with cameras connected thereto, other than an ordinary imaging apparatus such as a video camera.

Additionally, the above-described embodiment is described as including the map information database portion 110, however, the imaging apparatus 1 may not be provided with the map information database portion 110 and acquire map information corresponding to position information from the map information provision apparatus 3 each time. In this case, database becomes no need to be retained, thus becoming no need to secure storage capacity for the database. Further, it becomes possible to acquire updated data from the map information provision apparatus 3 and to prevent inconsistency between the taken image and the map information, so that it is possible to acquire a correct place name, a building name and the like, all the time.

Moreover, the above-described embodiment is described as including "distance" in map data, however, the map information may be acquired from latitude/longitude. That is, latitude and longitude of an object are calculated from the distance to the object and latitude, longitude and direction of an imaging apparatus. Then, the map information corresponding to the calculated latitude and longitude may be acquired. In this case, there is no need for storing information related to "distance" in the map data.

EXPLANATIONS OF NUMERALS 1 imaging apparatus
102 video imaging portion
104 voice input portion
106 position information acquisition portion
108 map information acquisition portion
110 map information database portion
112 communication portion
114 multiplex portion
116 recording medium interface portion
118 recording medium
120 operation input portion
122 search control portion
124 separation portion
126 video image output portion
128 text output portion
130 voice output portion
3 map information provision apparatus

What is claimed is:

1. An imaging apparatus comprising:
a video imaging portion configured to take a video image and generate a video image data from the video image;
a position information acquisition portion configured to acquire position information indicating latitude/longitude of the imaging apparatus;
a map information acquisition portion configured to acquire map information corresponding to the position information acquired by the position information acquisition portion;
a recording medium interface portion configured to store recorded data by repeatedly recording, on a recording medium, the video image data and a supplementary data, between from a start of taking the video image to a finish of taking the video image;
a separation portion configured to separate the supplementary data from the recorded data on the recording medium; and
a video image output portion configured to, in a case that the video image data is reproduced, output the video image data and the map information corresponding to the supplementary data.

2. The imaging apparatus according to claim 1, wherein the position information acquisition portion is configured to acquire a direction of the imaging apparatus as the position information together with the position of the imaging apparatus, and
the map information acquisition portion is configured to acquire the map information based on the position of the imaging apparatus and the direction of the imaging apparatus included in the position information.

3. The imaging apparatus according to claim 1, wherein the map information acquisition portion is configured to acquire the map information based on imaging conditions of the video image taken by the video image portion together with the position information, and
the imaging conditions are angle of view, focal length and depth of field.

4. The imaging apparatus according to claim 1, further comprising:
a communication portion configured to communicate with a map information provision apparatus for providing map information, wherein
the map information acquisition portion is configured to acquire the map information corresponding to the position information acquired by the position information acquisition portion from the map information provision apparatus via the communication portion.

5. The imaging apparatus according to claim 1, further comprising:
a multiplex portion configured to multiplex the moving image and map information, as contents data,
wherein the recording medium interface portion is configured to record the contents data multiplexed by the multiplex portion.

6. The imaging apparatus according to claim 5, wherein in a case where multiplexing the video image data and the map information associated with the video image data as the contents data, the multiplex portion is configured to multiplex the video image data and the map information to associate with the supplementary data or the time in which the map information is acquired.

7. The imaging apparatus according to claim 5, further comprising:
a voice input portion configured to input a voice, wherein the multiplex portion is configured to multiplex the video image data, the map information associate with the video image data and voice data of the voice inputted by the voice input portion as the contents data.

8. The imaging apparatus according to claim 1, wherein the position information acquisition portion is configured to acquire the position information in a case that the recording medium interface portion records the video image and supplementary data.

9. The imaging apparatus according to claim 1, further comprising:
an input portion configured to input a search word; and
a search control portion configured to control over searching the map information that coincides with the search word input by the input portion from the map information recorded as contents data.

10. The imaging apparatus according to claim 9, wherein in a case that the search word is not included in the contents data, the video image output portion is configured to output the video image or from a predetermined position of the contents data.

11. The imaging apparatus according to claim 9, wherein in a case where outputting the video image, the video image output portion is configured to superimpose the map information associated with the video image on the video image to be output.

12. The imaging apparatus according to claim 1, wherein the map information is text data of a name of an imaged object.

13. The imaging apparatus according to claim 1, wherein a reproducing position of a video image data to be reproduced is determined by selecting a search word from among a plurality of candidates for search words.

14. The imaging apparatus according to claim 1, wherein by designating the map information or designating the supplementary data, displaying of the video image data and the map information are started from the video image data and the map information, at a time corresponding to the supplementary data or the time when the map information was acquired.

15. The imaging apparatus according to claim 1, wherein the video image data is reproduced from a reproducing position determined on the basis of the time when the map information was acquired.

16. The imaging apparatus according to claim 1, wherein a reproducing position of a video image data to be reproduced is determined by selecting a search word from among a plurality of candidates for search words.

17. The imaging apparatus according to claim 1, wherein
the video image output portion is further configured to, in a case that the video image data recorded on the recording medium is reproduced, output the video image data and the map information at the time having been recorded on the recording medium, in response to the video image data being taken.

18. A non-transitory computer-readable medium having instructions stored thereon, such that when the instructions are read and executed by a processor, the processor is configured to perform the following:
acquiring a video image and generating a video image data from the video image;
acquiring position information indicating latitude/longitude of an imaging apparatus;
acquiring map information corresponding to the acquired position information;
repeatedly recording, on a recording medium, the video image data and a supplementary data, between from a start of taking the video image to a finish of taking the video image;
separating the supplementary data from the recorded data on the recording medium; and
in a case that the video image data is reproduced, outputting the video image data and the map information corresponding to the supplementary data.

19. An imaging method of an imaging apparatus, the imaging method comprising:
acquiring position information indicating latitude/longitude of the imaging apparatus;
acquiring map information corresponding to the acquired position information;
repeatedly recording, on a recording medium, the video image data and a supplementary data, between from a start of taking the video image to a finish of taking the video image;
separating the supplementary data from the recorded data on the recording medium; and
in a case that the video image data is reproduced, outputting, the video image data and the map information corresponding to the supplementary data.

20. The imaging method according to claim 19, further comprising:
inputting a search word;
searching of the map information that coincides with the inputted search word from the map information recorded as contents data; and
outputting a video image data corresponding to the searched map information.

21. A non-transitory recording medium recording the imaging method according to claim 19.

22. A non-transitory recording medium recording the video image and the supplementary data, wherein
the video image and the supplementary data being produced by the imaging method according to claim 19.

* * * * *